United States Patent [19]

Takeyama et al.

[11] Patent Number: 5,257,316
[45] Date of Patent: Oct. 26, 1993

[54] ACOUSTIC CONDUCTANCE AND SILENCER UTILIZING SAME

[75] Inventors: Hiroaki Takeyama, Kobe; Masao Taki, Tokyo; Takuji Mori, Tokorozawa, all of Japan

[73] Assignees: Matsushita Electric Works, Ltd., Osaka; Nishiwaki Laboratory, Tokyo, both of Japan

[21] Appl. No.: 782,098

[22] Filed: Oct. 24, 1991

[30] Foreign Application Priority Data

Oct. 31, 1990 [JP] Japan .................. 2-291892
Mar. 22, 1991 [JP] Japan .................. 3-058805

[51] Int. Cl.⁵ .............................. H03B 29/00
[52] U.S. Cl. .............................. 381/71; 381/94
[58] Field of Search .......................... 381/71, 94

[56] References Cited

U.S. PATENT DOCUMENTS

| 2,840,178 | 6/1958 | Boleslav | 181/155 |
| 4,473,906 | 9/1984 | Warnaka et al. | 381/71 |
| 4,527,282 | 7/1985 | Chaplin et al. | 381/71 |
| 4,589,133 | 5/1986 | Swinbanks | 381/71 |
| 4,665,549 | 5/1987 | Eriksson et al. | 381/71 |
| 4,947,434 | 8/1990 | Ito | 381/71 |
| 4,965,837 | 10/1990 | Murayama et al. | 181/155 |

Primary Examiner—John K. Peng
Assistant Examiner—Edward Lefkowitz
Attorney, Agent, or Firm—Leydig, Voit & Mayer

[57] ABSTRACT

An acoustic conductance is formed with oscillatory planes parallel to a duct and disposed on an identical circumference of the duct along a plane intersecting at right angles the duct so that the total area of the oscillatory planes will be substantially more than twice as large as a sectional area of the duct. The acoustic conductance is thereby made less affective on a fluid and provides a pertinent disposition of the acoustic conductance.

22 Claims, 11 Drawing Sheets

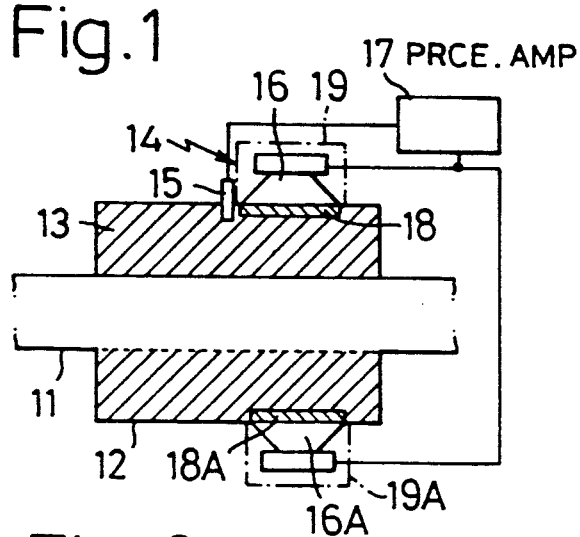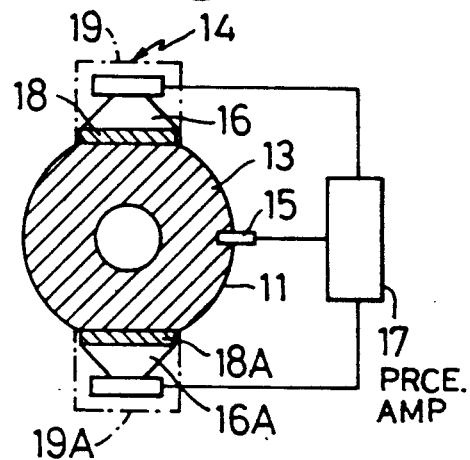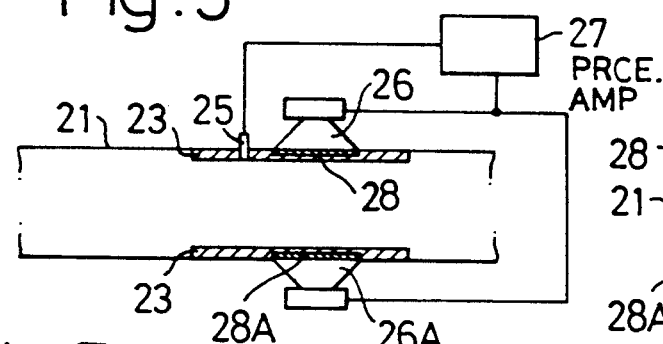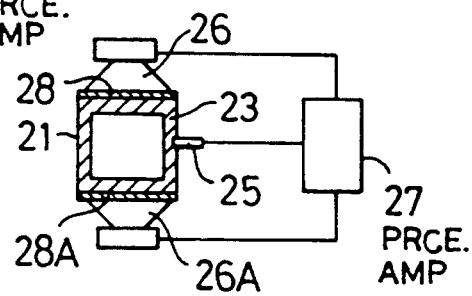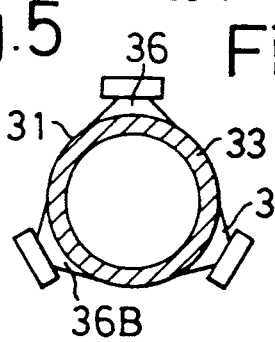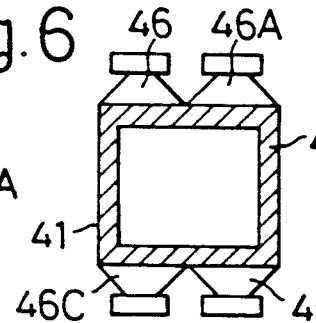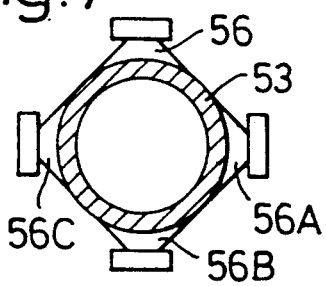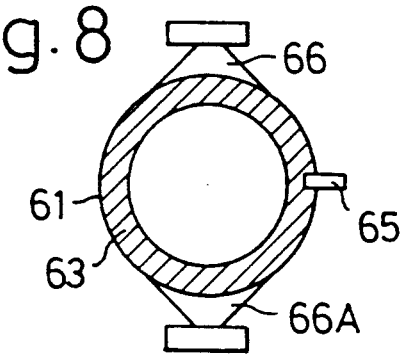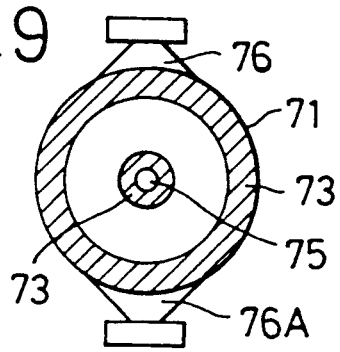

ACOUSTIC CONDUCTANCE AND SILENCER UTILIZING SAME

BACKGROUND OF THE INVENTION

This invention relates to an acoustic conductance and a silencer utilizing the same and, more particularly, to the acoustic conductance incorporated in a duct system to cope with noises in the system as well as the silencer for controlling noises in the duct system.

DESCRIPTION OF RELATED ART

In silencing the noises in the duct system, conventional silencing measures, of a so-called passive type arrangement provide an expansion chamber and the like which utilizes the interference of sound waves in the duct. Additionally, there has also been a technique of concurrently using an acoustical absorbent material such as glass wool or the like so as to elevate the absorption coefficient with respect to the energy that generates the noises in the duct system. Here, the duct itself and the acoustical absorbent disposed in the expansion chamber formed in the duct will be an equivalent to a disposition in series to the duct of a resistor with respect to the noises.

With such passive type silencing arrangement, however, it has been difficult to render a complete reflection band to be larger and to sufficiently achieve the function of acoustical absorption. It has been found that there exists a frequency band in which a negative silencing characteristic may exist that is, an increment of noises arises due to inherent characteristics of an acoustic reflecting surface or to a position of the expansion chamber and so on. Further, when a sufficient silencing action is attained, there has arisen a problem that a required structure of elements for the silencing arrangement in the duct system has to be made remarkably complicated and a loss of transmission pressure occurs.

To cope with such problem, it has been suggested in, for example, U.S. Pat. No. 2,043,416 to Paul Lueg, to provide an arrangement for causing acoustic waves propagated from an upstream side of the duct system to completely reflect, at a position of a secondary noise source, back to the upstream side. In other words, an arrangement for attaining the silencing by superposing on the noises, to be absorbed, i.e., a primary noise a noise of reverse phase to the primary noise, i.e., a secondary noise. Theoretically, with this arrangement, there can be formed a complete reflection plane over a wide frequency band of noises and a complete acoustic absorption can be attained. In many active control methods currently practiced with respect to the duct system noises, a silencing arrangement as described in the Lueg patent has been employed. In this way, a sound pressure of the primary noise on the secondary noise source will be anticipated from a reference signal on the upstream side of the duct system by utilizing a digital signal processing method so as to cancel the primary noise with the secondary noise provided at the reverse phase. In this case, an ideal operation mode will be that the secondary noise is of the same amplitude as and the reverse phase to the primary noise so as to completely carry out the cancellation or, in other words, to form a complete reflection plane on the secondary noise source. In this manner, any transmitting propagation of sound to the downstream side is prohibited and the sound waves are all reflected back to the upstream side.

As an active control method which is less influenced by any variation in noise propagating conditions in the duct system and still easy to be implemented has been suggested by K. Eghtesadl et al in 1983. This device includes a tight coupling mono-pole hereinafter "TCM") in which a microphone for collecting reference signal noise and a loudspeaker as the secondary noise source are disposed at the same position in the duct system. Further, in Japanese Patent Application No. 1-235802 of an earlier invention by the present inventors, there has been proposed an acoustic conductance with out a complete reflection at the secondary noise source but with an active element of a simpler arrangement employed. This acoustic conductance may be constructed by a low gain TCM active element. The acoustic characteristics of this element, in a case of the low gain, are not for performing the complete reflection but are equivalent to a conductance of a passive element. The element can play an effective part which has not been obtained by any conventional passive element for silencing the duct system. (This element has been described in detail in P.1277-P.1280, "inter-noise 90 Volume II" of Science for Silence edited by H. G. Jonasson, Gothenburg-Sweden, 13-15 Aug. 1990.)

While any arrangement employed as the conventional TCM may be realized theoretically by means of a feedback at a gain of infinity of signals from an acoustic sensor disposed close to the secondary noise source there have been various problems in practice that:

1. required sound pressure and volume velocity cannot be obtained unless the secondary noise source has the proper characteristic impedance with respect to duct;

2. since the sound wave generated from the secondary noise source cannot fully reach a plane wave at a portion in the duct in close proximity to the secondary noise source, the acoustic signal of the noise collected by the acoustic sensor is improper, causing oscillations to occur, eliminating gains and, thus no sufficient function can be attained;

3. due to a phase characteristic in the acoustic sensor and/or the secondary noise source, the reverse phase noise generated at the secondary noise source involves a delay with respect to the sound wave propagated within the duct, so that an oscillation will take place, so that no large gain can be obtained and an available frequency range will be made narrower;

4. in an event where a noise generating source includes a sound of a high frequency component which is a cause of the oscillation due to the phase characteristic of the acoustic sensor and secondary noise source, the oscillation can be easily excited;

5. since the arrangement is to expose the acoustic sensor to the fluid inside the duct, there arises an acoustic arch-fact (a windblown noise caused by the fluid) which is detected together with the noises propagated, and the acoustic sensor and secondary noise source are damaged due to heat, dust, mist and so on; and 6. there is a possibility that a stable operation cannot be attained due to a rise in the gain of the oscillation loop with a temperature change in the duct, deterioration with age and the like, which occasionally causes the oscillation to occur.

SUMMARY OF THE INVENTION

A primary object of the present invention is, therefore, to provide a proper acoustic conductance arrangement for eliminating the above problems, reducing any influence on the fluid, and realizing the performance theoretically expected by providing proper arrangements for the acoustic sensor and the secondary noise source.

According to the present invention, the above objects can be realized by an acoustic conductance including a secondary noise source having an acoustical impedance and including an oscillatory plane facing an interior of a duct. The duct includes an axis, an area, a circumference and an acoustical impedance. The duct is coupled to a primary noise source. The secondary noise source is disposed on the circumference of the duct along a plan perpendicular to the axis. The oscillatory plane has a total area substantially more than twice the area of the duct.

Other objects and advantages of the present invention shall be made clear as an explanation of embodiments of the invention advances in the followings.

BRIEF DESCRIPTION OF THE DRAWINGS

FIG. 1 is a schematic longitudinally sectioned view in an embodiment of the acoustic conductance according to the present invention;

FIG. 2 is a schematic cross sectioned view of the embodiment of FIG. 1 at a position rotated by 90 degrees from that of FIG. 1;

FIG. 3 is a schematic longitudinally sectioned view in another embodiment of the present invention;

FIG. 4 is a schematic cross sectioned view of the embodiment of FIG. 3 at a position rotated by 90 degrees from that of FIG. 3;

FIG. 5 through 10 are schematic cross sectioned views in respectively different embodiments of the acoustic conductance in which the secondary noise source is disposed in accordance with the present invention;

Figure 11:
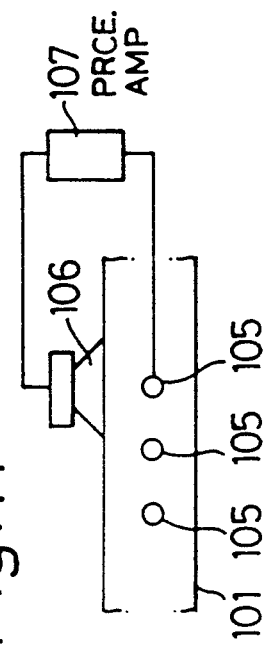
FIG. 11 is an explanatory view in a working aspect with the secondary noise source and sensor arranged according to the present invention.

While the present invention shall now be explained with reference to the various embodiments, it should be appreciated that the intention is not to limit the present invention only to these embodiments shown but rather to include all alterations, modifications and equivalent arrangements possible within the scope of appended claims.

DETAILED DESCRIPTION OF THE PREFERRED EMBODIMENTS

Referring to FIGS. 1 and 2, there is shown an embodiment of the acoustic conductance according to the present invention, which is contributive to a formation of a low gain TCM or, in other words, an active acoustic conductance (which shall be hereinafter referred to simply as "AAC"). In this case, a main duct 11 has an expansion chamber 12 as a passive silencer with an acoustic absorption material 13 inserted therein, and an acoustic conductance 14 is combined with this expansion chamber 12. More concretely, the acoustic conductance 14 is formed by assembling to the passive silencer 12 an acoustic sensor 15, secondary noise source 16, and a processing and amplifying means 17. For the acoustic sensor 15, a microphone may be generally employed, while not required to be limited thereto. For example, an oscillation pick-up or the like may be also employed. For the secondary noise source 16, generally a loudspeaker is used although it is not limited thereto. In the event where the loudspeaker is employed, it should be appreciated that a speaker box 19 as shown by imaginary lines is to be provided.

Further, a plurality of the secondary noise sources 16 are provided around the expansion chamber 12, that is, on an identical circumference along a plane intersecting at right angles the longitudinal axis of the duct 11, and the acoustic sensor 15 is disposed at a position slightly on the upstream side with respect to the center of the secondary noise sources 16 and 16A. In this case, the position where the optimum acoustic conductance is to be constructed should be chosen to be about ⅓ of the length of the expansion chamber 12, while not required to be so limited. As seen from these secondary noise sources 16 and 16A, it is necessary that radiations of the sound waves are produced on both of the upstream and downstream sides in the duct 11. In order to achieve the radiation in the duct 11 with the required sound pressure and volume velocity, it is optimum to employ the secondary noise sources 16 and 16A having areas more than twice as large as that of the cross sectional area of the duct 11. In order that such conditions are satisfied, except for an event where the duct is flat, a plurality of the secondary noise sources 16 and 16A are provided to the duct 11 on the identical circumference thereof as has been described, and the individual one of the secondary noise sources 16 and 16A may be reduced in amplitude since the required magnitude of the noise source, i.e., the volume velocity and sound pressure are fixed. For this reason, it is possible to dispose the acoustic sensor 15 in proximity to the secondary noise sources 16 and 16A, taking advantage a multiplicative effect of a ring formation of the noise sources in which any phase delay in the respective secondary noise sources is reduced, and of the amplitude reduction in each of the plurality of the noise sources.

In practical use, the arrangement should preferably be made such that two of the secondary noise sources 16 and 16A, each having almost the same area as the cross sectional area of the duct 11, are provided to oppose each other. In this case, it is possible for the two secondary noise sources 16 and 16A to commonly utilize the signal of the single acoustic sensor 15 by disposing this sensor 15 within a plane of symmetry of the two secondary noise sources 16 and 16A. This will allow a simpler arrangement than when a plurality of the acoustic sensors 15 are employed, and the disposition of the acoustic sensor 15 with respect to wall surface of the duct 11 becomes also simpler. Further, when the acoustic sensor 15 is provided to be slightly on the upstream side with respect to the secondary noise sources 16 and 16A, it is possible to attain the phase delay correction as well as a formation of a zone in which reverse phase noise generated by the secondary noise sources 16 and 16A will become a plane wave. For this reason, there can be obtained a distance corresponding to a delay time of the reverse phase sound wave generated from the secondary noise sources 16 and 16A with respect to the sound waves propagated through the duct 11 as caused by the phase delay of the secondary noise sources 16 and 16A. Further, while the generated sound waves of the secondary noise sources 16 and 16A cannot be deemed to be plane waves at a close proximity to the secondary noise sources 16 and 16A within the duct 11, there can be formed excellent plane waves at a position slightly upstream side thereof even when the sound, wave signal, collected by the acoustic sensor 15 in close proximity to the secondary noise sources 16 and 16A is improper and no oscillation or gain arises.

In the sound pressure generating plane of the secondary noise sources 16 and 16A, there is provided a slit-like element 18 to attain an impedence matching between the secondary noise sources 16 and 16A and the duct 11. While the element 18 is not required to be limited in the shape of the slit or its opening rate, a slit of an elongated elliptical or like shape, the major axis of which lies in a flowing direction of the objective noise to be controlled, may be optimum, depending on the acoustic absorption system. Further, the secondary noise sources 16 and 16A and acoustic sensor 15 as well are protected at their periphery by the acoustic absorption material 13 of a glass wool or the like which also functions as a heat insulating member, so as to isolate them from the fluid within the duct 11. Thus any high frequency component causing an oscillation or the like due to the acoustic absorption material 13 can be attenuated and any resonance of the duct 11 can be restrained, that is, no howling is caused to occur so as to stabilize the operation of the acoustic conductance as the AAC.

According to the present invention, in addition, the AAC can, be optimumly constituted. Here, the term "AAC" refers to a sensor for collecting the reference signal, which is the one formed by disposing the microphone 15 and secondary noise source 16 substantially at the same position or proximate to each other. Thus, the gain is restricted to be relatively low, for example, less than about 20 dB and the sensor is operated within a range causing no oscillation. The The AAC is intentionally operated as an incomplete reflection plane so that stable operation is easy to attain, whereas the intention of the conventional TCM is to achieve the complete reflection plane, the operation of which is apt to become unstable. With the AAC, the noise signals collected by such acoustic sensor 15 as the microphone are subjected to such optimum signal processing as an inversion, so that, as amplified by the amplifier 17, a reverse-phase noise will be radiated out of such secondary noise source 16 as a loudspeaker or the like.

As has been described, the acoustic conductance 14 comprising the acoustic sensor 15, secondary noise sources 16 and signal processing and amplifying means 17 is provided to the expansion chamber 12, so that the sound waves propagated from the upstream side in the duct 11 will be reflected or absorbed by this acoustic conductance 14 and cause the acoustic absorption material 13 to be thereby silenced. Here, the total area of the oscillating plane of the plurality (two in the drawings) of the secondary noise sources 16 and 16A provided around the expansion chamber 12 is set to be about twice as large or more as the sectional area of the expansion chamber 12, so that the sound waves radiated by the plurality of secondary noise sources 16 and 16A within the expansion chamber 12 will form a ring-like noise source in the space of the expansion chamber 12 in front of the secondary noise sources 16 and 16A and, thus, a sound field of the reverse phase matching with the characteristic or (acoustical) impedance of the expansion chamber 12. Further, this matching with the characteristic impedance can be promoted by the slit-like elements 18 disposed in front of the secondary noise sources 16 and 16A.

With the foregoing impedance matching, it is easier for the plane waves to propagate. With the driving of the plurality of the secondary noise sources rather than a single secondary noise source, it is possible to reduce the oscillation amplitude for each of the secondary noise sources 16 and 16A to also reduce the phase delay of the respective sources and to further provide the acoustic sensor 15 in proximity with the center position of the secondary noise sources 16 and 16A. The acoustic absorption material 13 of the glass wool or the like disposed in the expansion chamber 12 and functioning also as the heat insulating member is effective to attenuate the high frequency component which can be a cause of the oscillation or the like due to the phase change, so as to restrain any resonance. The acoustic absorption material 13 also functions as a resistance component in series with the transmission path so as to act to further elevate the silencing effect in the concurrent use with the parallel acoustic conductance. The acoustic absorption material 13 prevents the acoustic sensor 15 and secondary noise sources 16 and 16A from being exposed directly to the fluid within the expansion chamber 12 so as to be less influenced by the fuild. Any influence of the acoustic arch-fact (windblown noise and so on) can be restricted, and the acoustic sensor and secondary noise source are not deteriorated by the heat, dust and mist.

On the other hand, the acoustic conductance according to the present invention may be applied directly to the duct 11 without providing any expansion chamber. In FIGS. 3 and 4, the same constituents as those in the embodiment of FIGS. 1 and 2 are denoted by the same reference numerals as those used in FIGS. 1 and 2 but with a figure "10" added thereto. Except for the provision of the expansion chamber, substantially the same operation can be preformed.

Figure 10:
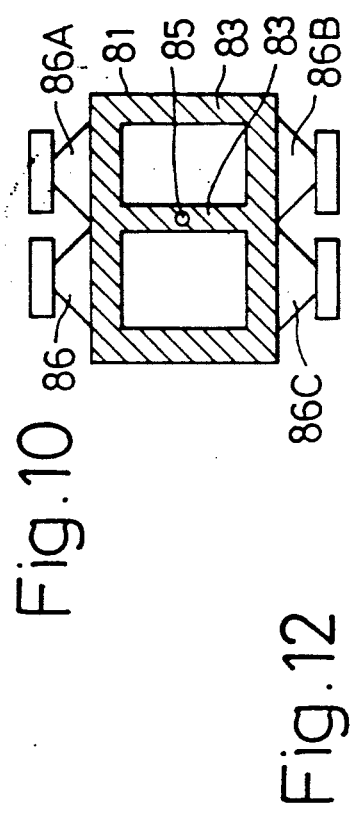

For the arrangement of the acoustic sensor, secondary noise source and acoustic absorption material, it is possible to employ such various arrangements as shown respectively in FIG. 5 where three of the secondary noise sources 36, 36A and 36B are disposed on an identical circumference of, the duct 31 of a circuit section as mutually spaced by an equal angle. FIG. 6 shows four of the secondary noise sources 46, 46A, 46B and 46C provided on a circumference identical with respect to the flow within the duct 41 of a rectangular section. FIG. 7 shows four of the secondary noise sources 56, 56A, 56B and 56C provided on a circumference identical with respect to the flow within the duct 51 of a circular section. Further arrangements employable are shown in FIG. 8. In this embodiment, the acoustic sensor 65 is embedded in the acoustic absorption material 63 surrounding the inner wall of the duct 61. FIG. 9 shows the acoustic sensor 75 positioned in the center of the duct 71 as enclosed by the acoustic absorption material 73. FIG. 10 shows a partition made of the acoustic absorption material 83 and the acoustic sensor 85 is embedded within this partition. In the embodiments of FIGS. 5 to 10, substantially the same constituents as in the embodiment of FIGS. 1 and 2 are denoted by the same reference numerals as those used in FIGS. 1 and 2 but with a figure "20", "30", "40", "50", "60"or "70" added sequentially. Substantially the same operation is realized.

In the foregoing embodiments shown in FIGS. 1 through 10, further, there have been suggested the arrangements in which the acoustic conductance is applied to the AAC, while not required to be limited to them. It is also possible to apply the invention to an acoustic damper or the like. This acoustic damper is to mean the one which deforms by itself in accordance with variation in the sound pressure due to the noise and absorbs the energy by means of a resistance accompanying the deformation. Such articles as a corn part of a loudspeaker having a viscosity equivalent to the oscillation, rubber film having the viscosity, or a piston are included in acoustic dampers.

In addition, various silencing tests have been carried out with respect to the foregoing acoustic conductance according to the present invention, examples of which are described as follows.

A. Silencing Effect of Sectional Area of Duct and Oscillatory Area of Noise Source

TABLE I

| Example No. | Acoustic Conductance Arrangement | R | Silencing Effect (dB) |
|---|---|---|---|
| 1 | Duct of 10 cm square with 1 loudspeaker | 0.75 | 6 |
| 2 | Duct of 10 cm square with 2 loudspeakers | 1.50 | 8 |
| 3 | Duct of 75 mm diameter with 2 loudspeakers | 2.50 | 18 |

In the above, "R" is a rate (oscillatory area of secondary noise source/sectional area of duct). In Example 3, in addition to the use of a circular duct, there was provided an expansion chamber of a sectional area twice as large as that of the duct. When Examples 1 and 2 are compared with each other, the silencing effect is improved with an increment in the total oscillatory surface area of the secondary noise sources so long as the sectional area of the duct is constant, that is, with the enlargement of the oscillatory surface area of the secondary noise source in contrast to the sectional area of the duct. When Examples 1 and 3 are compared with each other, the silencing effect is remarkably improved by providing the expansion chamber and further enlarging the oscillatory area of the secondary noise sources. In other words, the remarkable silencing effect is to be obtained when the oscillatory area of the secondary noise source is made about twice as large as the sectional area of the duct.

B. Acoustic Sensor Position and Silencing Effect

Figure 12:
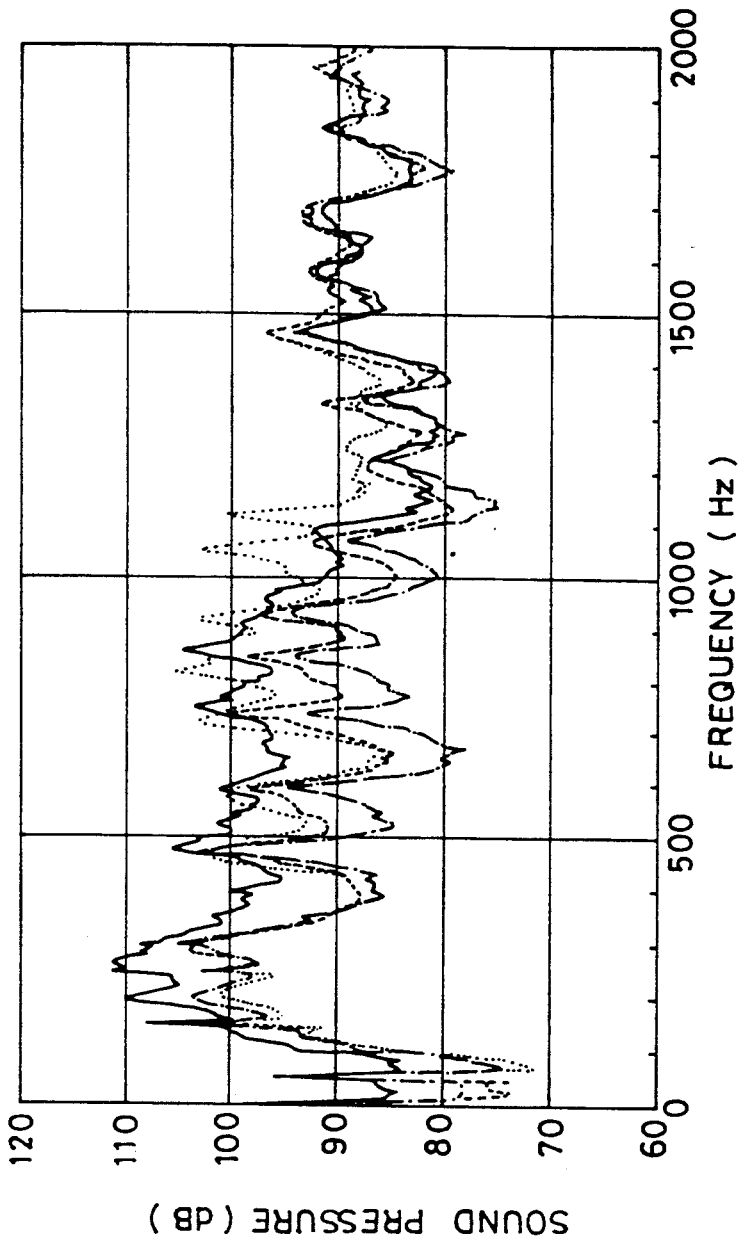
FIG. 12 is a diagram for showing varying silencing characteristics depending on the position of the sensor in the working aspect of FIG. 11.

The position of microphone as the acoustic sensor has been varied as shown in FIG. 11, with the silencing carried out. A comparison of the sound pressure level changes resulting from this variation shown in FIGS. 12 and 13. More concretely, the sound pressure changes caused when the microphone is shifted by 6 cm and 10 cm onto the upstream side from the center of the speaker, in an arrangement where two loudspeakers as two secondary noise sources are disposed as opposed, with respect to the duct formed to be 50 mm in diameter, are shown in FIG. 12. As a result, the sound pressure changes in the event where the acoustic sensor is positioned immediately downstream of the secondary noise source will be as represented by dotted-line curve in FIG. 12. The changes will be as represented by a broken-line curve when the sensor position is separated 6 cm from the secondary noise source The changes will be as represented by a chain-line curve in the drawing when the sensor position is further separated 10 cm. Thus, it is considered optimum that, when AAC is constituted, the acoustic sensor is disposed immediately below the secondary noise source. With the acoustic sensor disposed closer to the secondary noise source, it is made unnecessary to render the transmission function complicated. On the other hand, it is not preferable in practice that the acoustic sensor is positioned excessively closer to the secondary noise source. In FIG. 12, a solid-line curve represents a case in which AAC is in OFF state.

Figure 13:
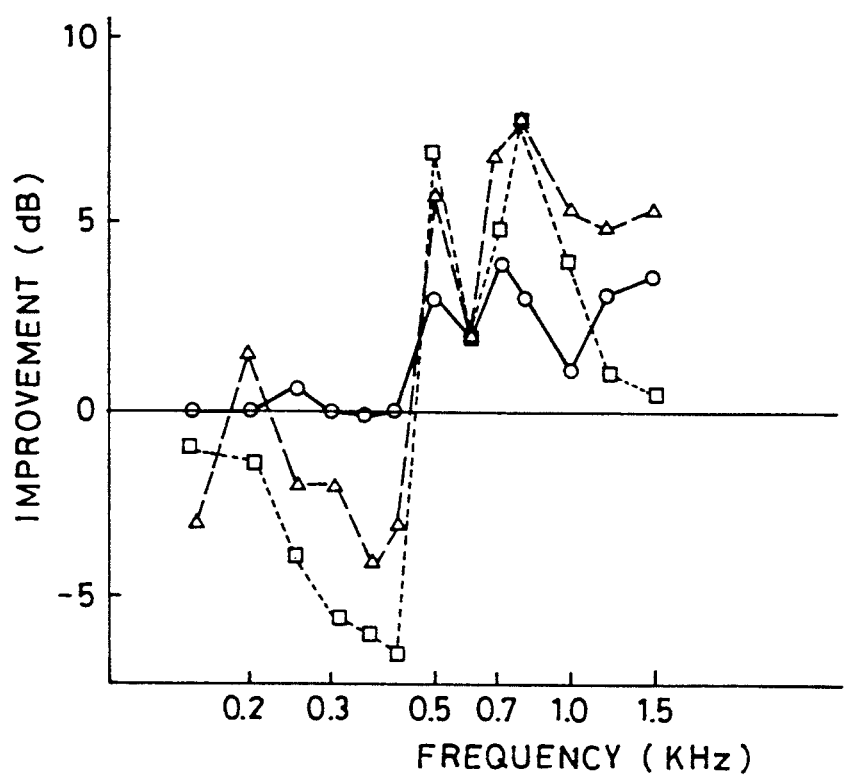
FIG. 13 is a diagram showing differences in the sound pressure level upon carrying out of the silencing action with the sensor shifted onto the upstream side in the aspect of FIG. 11.

Further, there are shown in FIG. 13 the sound pressure level fluctuation upon shifting of the acoustic sensor respectively by 5 cm, 10 cm and 15 cm onto the upstream side from the center of the loudspeaker, with the speaker center denoted by "0", in the arrangement where two of the secondary noise sources are disposed as opposed to each other with respect to the duct of 100 mm square. In this case, the speaker and amplifier differ from those used in the example of FIG. 12. Improvement upon disposition of the acoustic sensor above the secondary noise source (the acoustic sensor or microphone position 0 mm) is presented. The position of the microphone as the acoustic sensor is different in accordance with the form of the duct and the type of the speaker or the like as the secondary noise source. It has been found from FIG. 13 that no remarkable deterioration in the silencing effect and a stable improvement is obtainable when the microphone position is slightly on the upstream side of the secondary noise source, Preferably 5 cm upstream. This is in contrast to the embodiment of FIG. 11, in the case where the position is more remote. Therefore, while slightly variable in accordance with the form of the duct, oscilative area of the secondary noise source and so on, the optimum microphone position should exist slightly on the upstream side of the secondary noise source. The distance by which the acoustic sensor is separated from the secondary noise source can be made much smaller in the case where the oscillatory area of the secondary noise source is more than twice as large as the sectional area of the duct than in the case where the secondary noise source is less than twice large. Thus, the transmission factor between the acoustic, sensor and the secondary noise source does not have to be complicated. In FIG. 13, a curve plotted with "o" marks represents a case where the sensor position is 5 cm upstream, a curve with "Δ" denotes 10 cm upstream and a curve with "□" marks denote 15 cm upstream.

C. Relationship Between Secondary Noise Source Area and Acoustic Sensor Position:

Examples have been carried out employing a microphone used as the acoustic sensor and loudspeakers respectively having a sound-pressure generating plane substantially equivalent to the sectional area of the duct, resultant relationship of which have been as shown in a following Table II in which the area size of the employed loudspeaker is shown for convenience' sake in the number of the loudspeaker.

TABLE II

| Example No. | Number of Loudspeaker | Optimum Distance (mm) |
|---|---|---|
| 4 | 1 | 100 |
| 5 | 2 | 50 |
| 6 | 4 | 40 |

Here, the optimum distance is the one between the microphone as the acoustic sensor and the loudspeaker where the silencing characteristics are the best. In these examples, the loudspeaker employed was of the sound-pressure generating plane of 100 mm (sectional area of 7,850 mm$^2$), and the duct was made to be of a diameter 75 mm (sectional area of 4,415 mm$^2$). While the optimum position of the microphone forming the acoustic sensor varies depending on the shape of the duct and the type of the loudspeaker forming the secondary noise source, the optimum distance is apt to become shorter than the foregoing sensor position.

Figure 14:
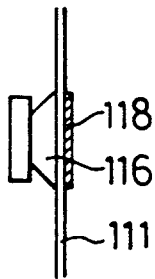
FIGS. 14 and 15 are schematic explanatory views of another embodiment employing a slit-like element according to the present invention.
Figure 15:
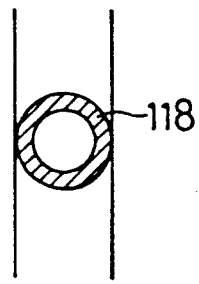
Figure 16:
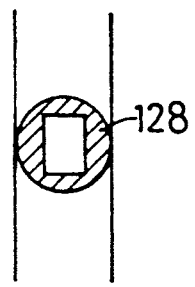
FIGS. 16 and 17 are explanatory views of still other working aspects employing the slit-like element.
Figure 17:
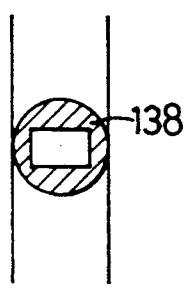
Figure 18:
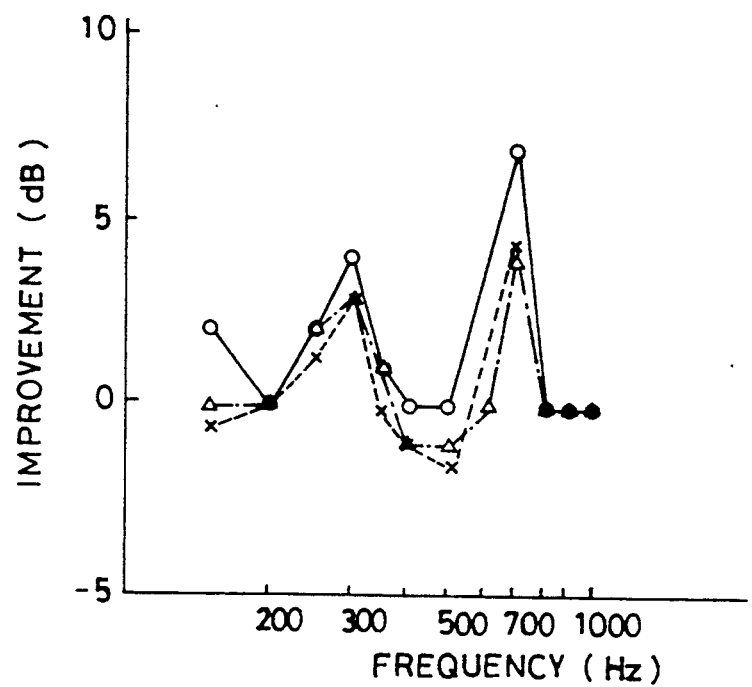
FIG. 18 is a diagram showing varying effect of improvements due to differences in the formation of the slit-like element of the present invention.

D. Slit-like Element at Front of Secondary Noise Source and Silencing Effect The silencing effect can be remarkably improved in the event where such slit 118 at shown in FIGS. 14 and 15 or such slit 128 or 138 as shown in FIG. 16 or 17 is provided at the front face of the secondary noise source. Of course, the slit formation should not be limited to those shown in FIGS. 14 to 17 but may properly be modified. In FIG. 18, the silencing improvements caused by the provision of the slit are shown. A curve plotted with "o" marks denotes a case of such provision of such circular slit as shown in FIG. 15 with an opening rate of 30% of the oscillatory area of the loudspeaker as the secondary noise source. A curve with "Δ" marks denotes a case of such rectangular slit as in FIG. 16 the longitudinal axis of which lying in axial direction of the duct and an opening rate of 63% of the oscillatory area, A curve with "x" marks denotes a case of such rectangular slit as in FIG. 17 the longitudinal axis of which transversing at right angles the axial direction of the duct and an opening rate of 63% of the oscillatory area. It should be appreciated, as would be clear from FIG. 18, that the silencing action is best improved in the case of "o" mark curve without showing any tendency of shifting to minus side and thus without increasing the noises. The case of "Δ" mark curve also achieves an excellent silencing function.

Figure 19:
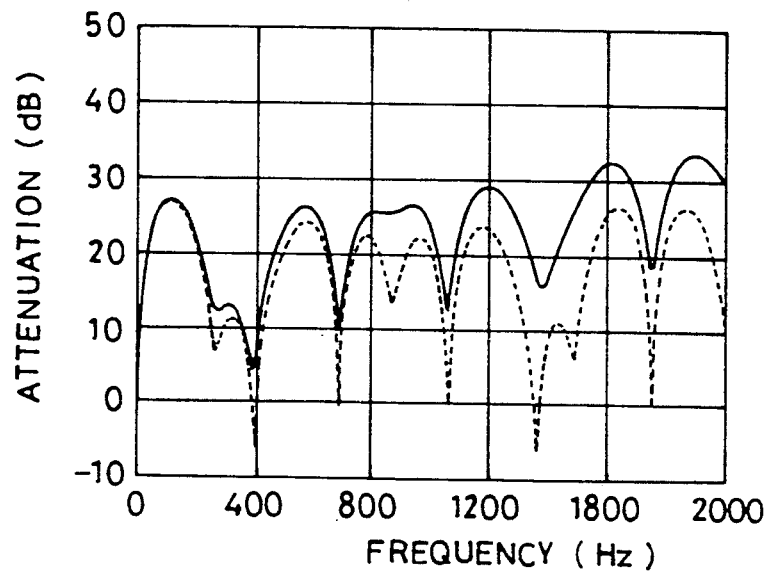
FIG. 19 is a diagram for showing differences in the silencing characteristics depending on the presence or absence of an acoustic absorption material according to the present invention.

E. Silencing Characteristics Upon Concurrent Use of Acoustic Absorption Material In FIG. 19, there is shown the silencing amount upon actuation of the AAC in both cases where the acoustic absorption material is provided and is not provided. In the drawing, a solid-line curve is of the case where a glass wool is provided as the acoustic absorption material, and a dotted-line curve is of the case of no acoustic absorption material. It is seen from these curves that the howling can hardly be generated in the case where the glass wool is provided as the acoustic absorption material so that the AAC actuation can be stabilized.

Figure 20:
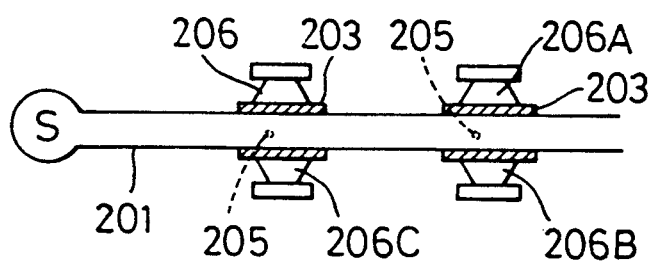
FIG. 20 is a schematic explanatory view of still another embodiment of the present invention.
Figure 21:
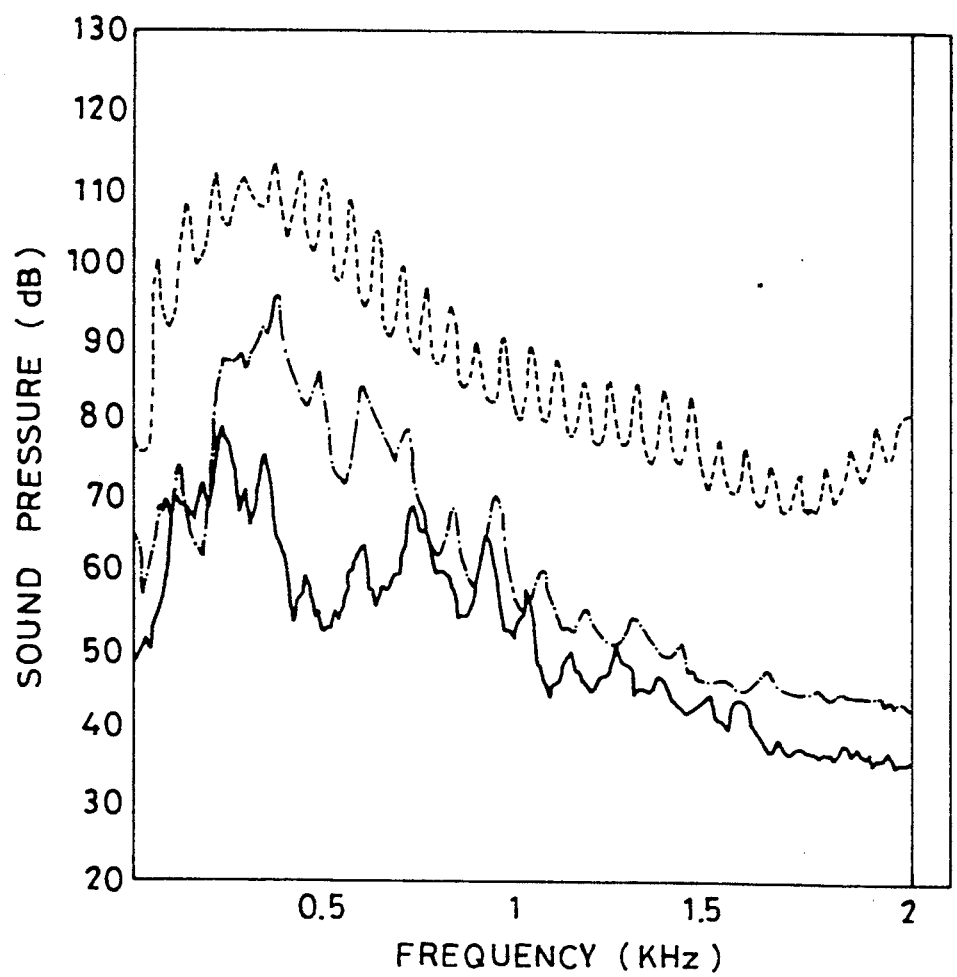
FIG. 21 is a diagram showing in the sound pressure level the silencing action with the embodiment of FIG. 20.

Further, the acoustic conductance according to the present invention also results in an excellent effect when provided at two positions on the duct which communicating with a noise source S as shown in FIG. 20. In the drawing, substantially the same constituents as those in the embodiment of FIGS. 1 and 2 are indicated by the same reference numerals as those in FIGS. 1 and 2 but with "190" added, which constituents realizing the same operation. In FIG. 21, there are shown attenuations in respect of the embodiment of FIG. 20, in which a broken-line curve represents variation in the sound pressure only of the duct, a chain-line curve represents the sound pressure variation in the duct with the amplifying means of the acoustic conductance made in OFF state, and a solid-line curve denotes the sound pressure variation in the duct with the amplifying means of AAC made ON and the acoustic conductance actuated into ON state. It has been found from these curves that the arrangement of FIG. 20 with the AAC kept in actuated state can attain the silencing by about 25 dB in average and a remarkable silencing effect can be obtained with this system, in perticular, at a zone close to 500 Hz.

Figure 22:
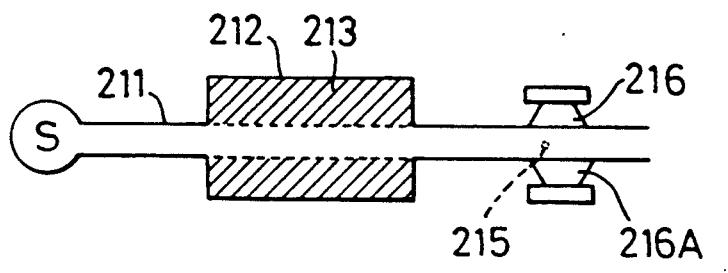
FIG. 22 is a schematic explanatory view of a further embodiment of the present invention.
Figure 23:
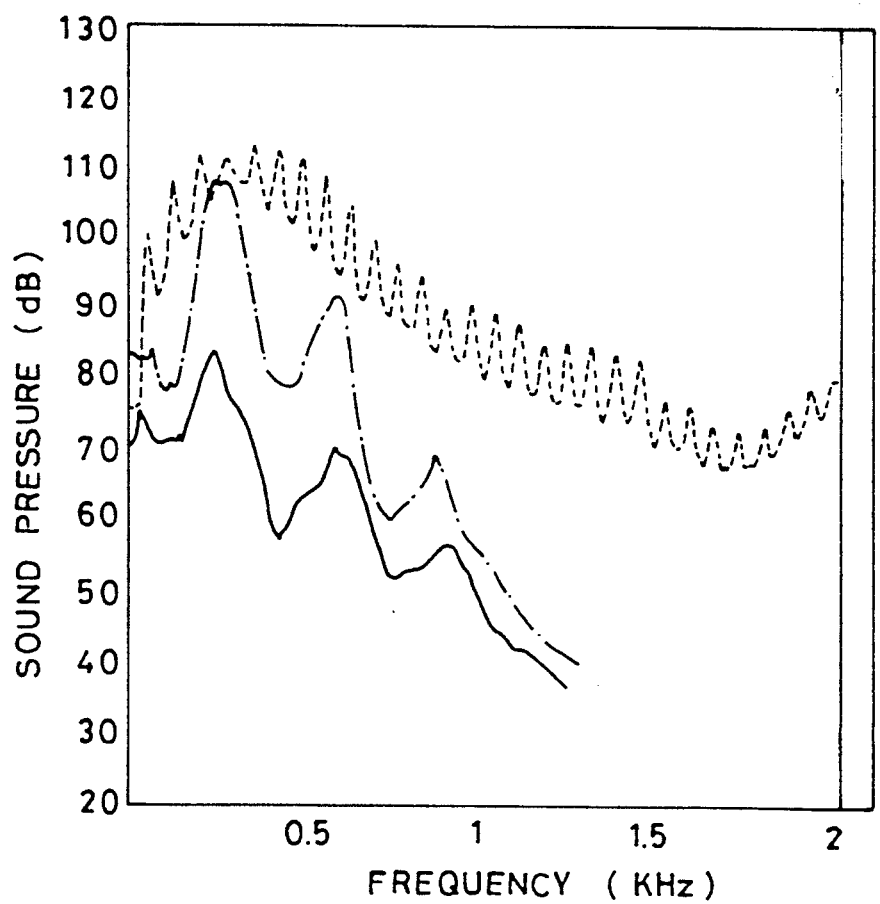
FIG. 23 is a diagram showing by means of the sound pressure level the silencing action attained with the embodiment of FIG. 22.

In an embodiment shown in FIG. 22, there is provided an arrangement in which the duct 211 is provided with the expansion chamber 212 filled with a glass wool as the acoustic absorption material 213 and the acoustic conductance is disposed at a position downstream of this expansion chamber 212. In the drawing, the same constituents as those in the embodiment of FIGS. 1 and 2 are indicated by the same reference numerals as those used in FIGS. 1 and 2 but with "200" added, which constituents realizing also the same operation. In FIG.

23, there are shown attenuations in respect of the embodiment of FIG. 22, in which a broken-line curve denotes the sound-pressure variation only of the duct, a chain-line curve shows the sound-pressure variation in an event where the duct is provided only with an expansion chamber, and a solid-line curve represents the sound-pressure variation in the case of the FIG. 22 arrangement in which the duct is provided with both of the expansion chamber and acoustic conductance. The provision of the expansion chamber and acoustic conductance to the duct allows a remarkable silencing effect to be attained.

Figure 24:
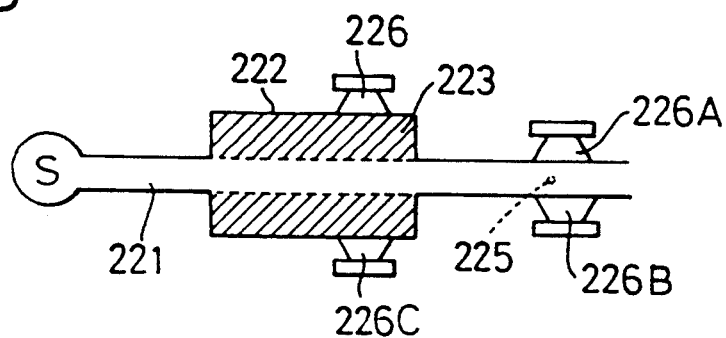
FIG. 24 is a schematic explanatory view of a still further embodiment of the present invention.
Figure 25:
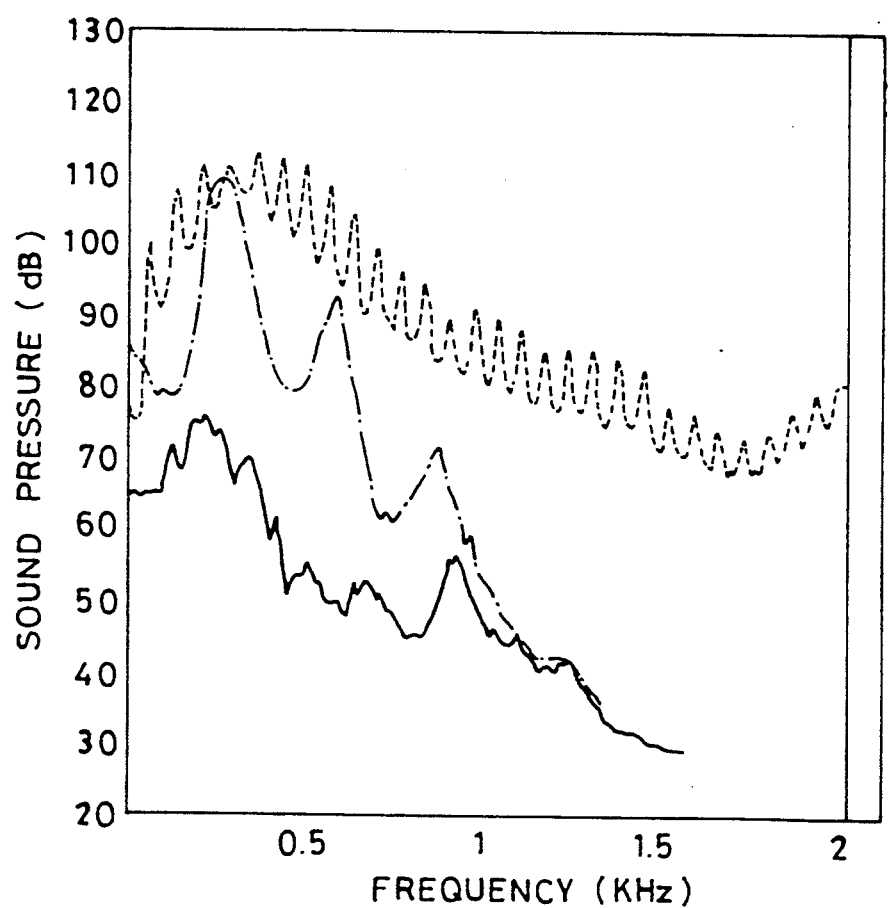
FIG. 25 is a diagram showing by means of the sound pressure level the silencing action attained with the embodiment of FIG. 24.

In an embodiment shown in FIG. 24, there is provided an arrangement in which the duct 221 is provided with the expansion chamber 222 carrying the acoustic conductance, the expansion chamber 222 is filled with a glass wool as the acoustic absorption material 223, and another acoustic conductance is disposed downstream of the chamber. In the drawing, the same constituents as those in the embodiment of FIGS. 1 and 2 are denoted by the same reference numerals as those used in FIGS. 1 and 2 but with "210" added, and the same operation can be realized by these constituents. In FIG. 25, there are shown attenuations in respect of the embodiment of FIG. 24, in which a broken-line curve denotes the sound-pressure characteristic only of the duct, a chain-line curve shows the sound-pressure characteristic in an event where the duct is provided only with an expansion chamber, and a solid-line curve represents the sound-pressure characteristic in the case of FIG. 24 where the acoustic conductance is provided to the expansion chamber and to the duct downstream of the chamber. It is seen that a further excellent silencing effect can be attained with the FIG. 24 arrangement.

Figure 26:
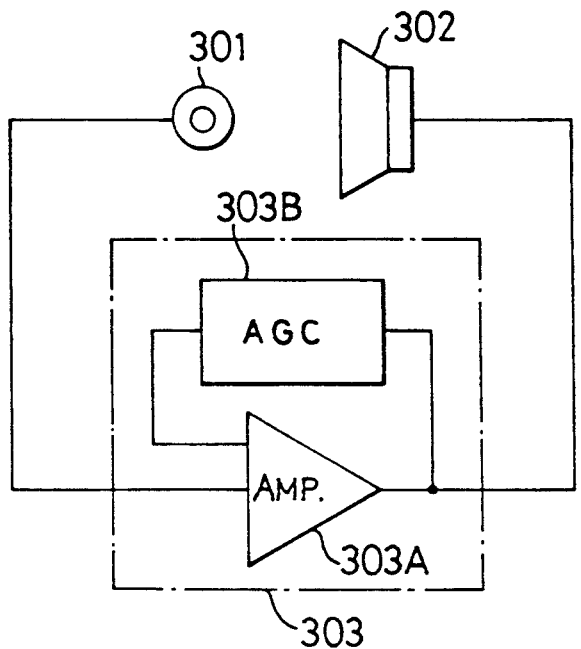
FIG. 26 is a schematic explanatory view of a further concrete embodiment of the silencer employing the acoustic conductance according to the present invention.
Figure 27:
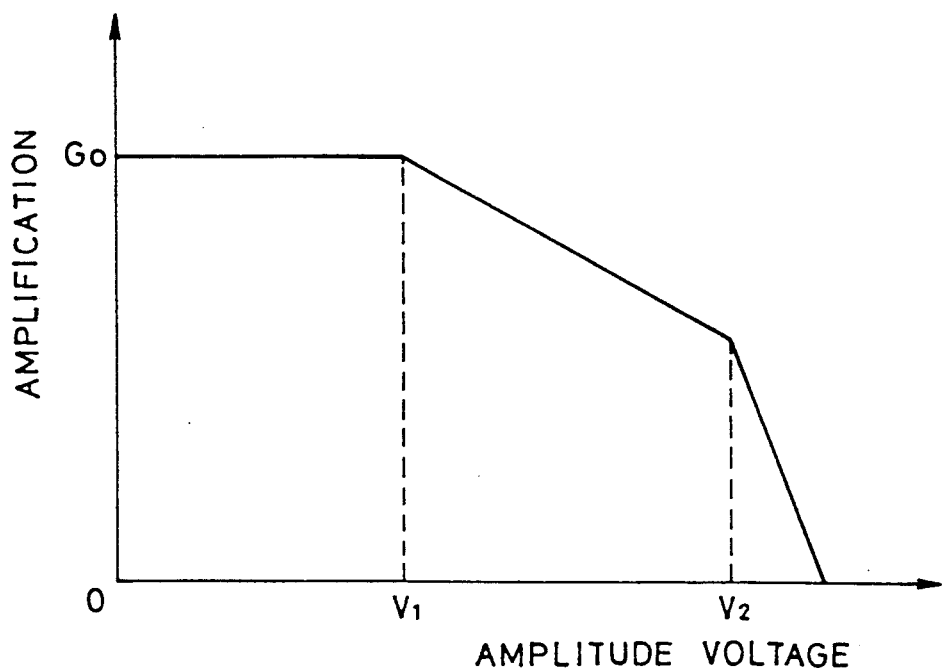
FIG. 27 is a diagram showing circuit operation of the silencer of FIG. 26.

According to another feature of the present invention, there can be provided a silencer which appropriately restricts the amplification degree at the amplifying means of the acoustic conductance in a state where the howling will take place. Referring to FIG. 26, the silencer in this embodiment according to the present invention includes a signal generating circuit 303 connected to a microphone 301 forming the acoustic sensor and a loudspeaker 302 forming the secondary noise source for generating a signal for driving the loudspeaker 302 on the basis of an output signal of the microphone 301, while this signal processing circuit 303 comprises an inverting amplifier circuit 303A acting simultaneously as an amplifying section and as a phase inverting section, and an AGC circuit 303B which is an amplification degree control section. This AGC circuit 303B attains a feedback control of the inverting amplifier circuit 303A so that the amplification degree of the inverting amplifier circuit 303A will be controlled in accordance with output signal level of the microphone 301 provided as input to the circuit 303A, that is, an amplitude voltage, such as shown in FIG. 27. More specifically, in FIG. 27, the amplification degree of the inverting amplifier circuit 303A is made to be of a constant value Go until the amplitude voltage of the output signal of the microphone 301 reaches a first threshold value V1. As the amplitude voltage exceeds the first threshold value V1, the amplification degree is decreased at a constant decrement in accordance with the increment in the amplitude voltage. Further, as the amplitude voltage exceeds a second threshold value V2, the decrement of the amplification degree is inlarged.

When in this case the amplification degree Go in the event where the amplitude voltage of the microphone output signal is below the first threshold voltage V1 is so set as to be of a level of causing no howling, the exceeding of the microphone output signal over the first threshold voltage V1 and showing a tendency of the howling to take place will cause the amplification degree to be lowered and the howling occurrence can be thereby restrained. When the amplitude voltage further exceeds the second threshold value V2, the decrement of the amplification degree is further enlarged and the howling occurrence can be reliably prevented.

Figure 28:
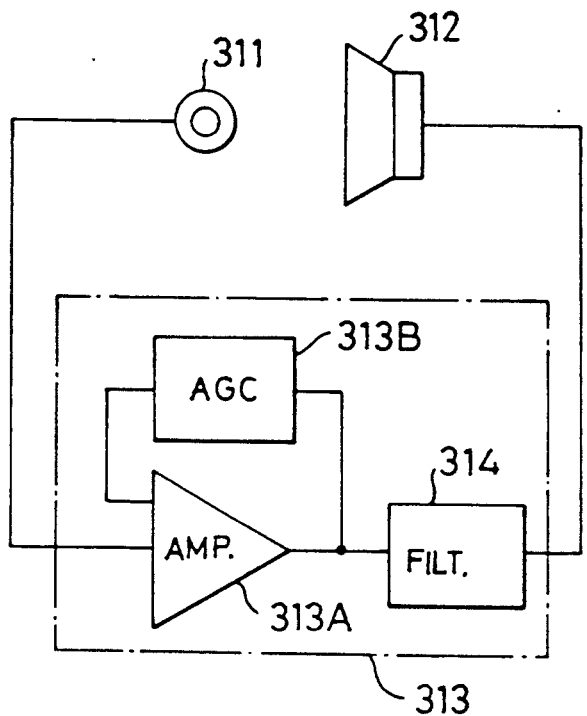
FIG. 28 is a schematic explanatory view of still another embodiment according to the present invention.
Figure 29:
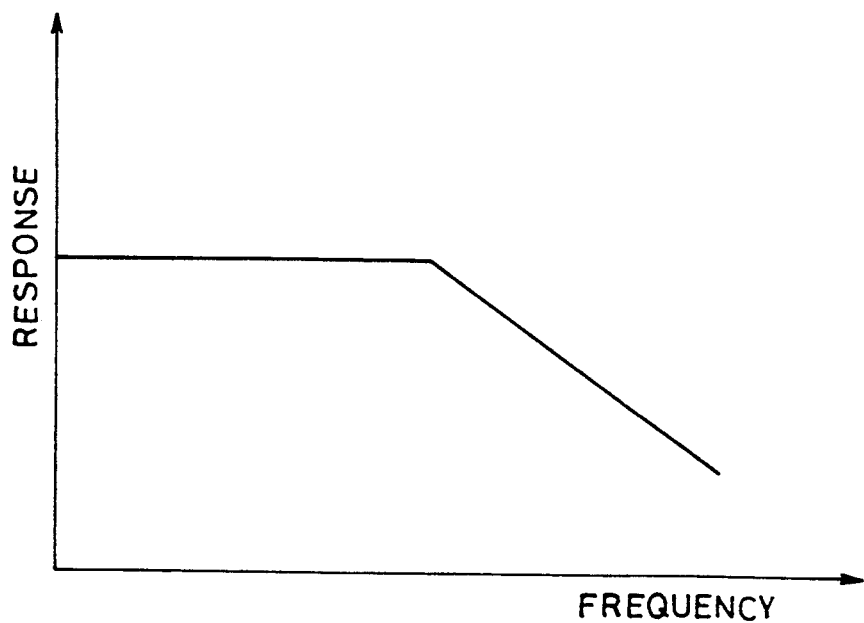
FIG. 29 is a diagram showing frequency response of a filter circuit in the silencer of FIG. 28.

In another embodiment as shown in FIG. 28 of the present invention, a filter circuit 314 acting as a frequency characteristics control section is inserted between the inverting amplifier circuit 313A and the loudspeaker 312, in order to correct the frequency characteristics in a loop of the microphone 311 → signal processing circuit 313 → loudspeaker 312 → microphone 311. For this filter circuit 314, a low-pass filter having such frequency response as shown in FIG. 29 may be employed. With the use of such filter circuit 314 having such characteristic, the amplification degree of the high frequency component in the above loop can be restrained. Since the high frequency component has a higher possibility of causing the howling to occur, in general, the use of the filter circuit 314 having such characteristic allows the effect of restraining the howling to be increased. That is, for the low frequency component, it is possible to render the amplification degree of the above loop to be larger, so that the silencing effect with respect to the noises of a larger sound pressure level of the low frequency component can be elevated.

While the embodiment of FIG. 28 has been shown to insert the filter circuit 314 between the inverting amplifier circuit 313A and the loudspeaker 312, this filter circuit 314 may be inserted as connected either to an output part or an input part of the AGC circuit 313B. Further, the frequency response of the filter circuit 314 is not always to be limited to such characteristics as in FIG. 29 but may properly be set depending on the object.

Figure 30:
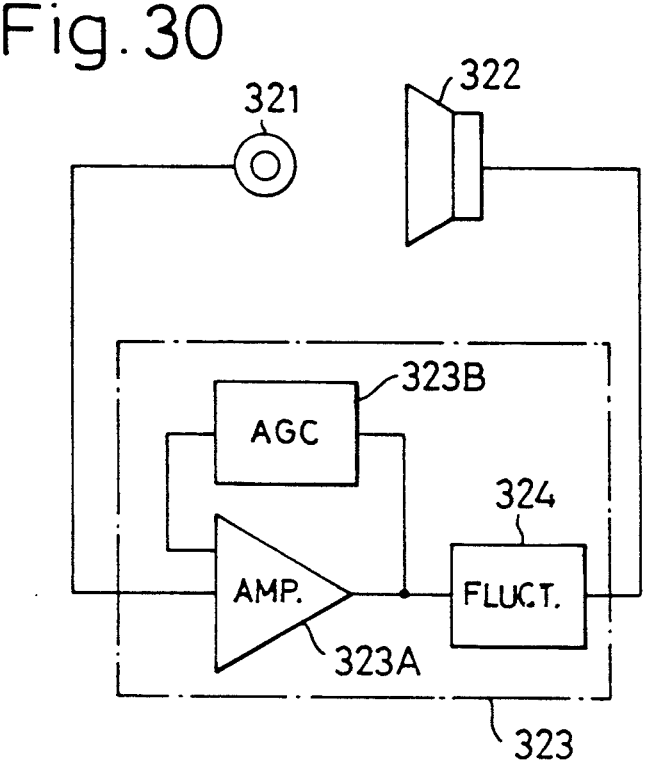
FIGS. 30 to 32 are schematic explanatory views of further embodiments of the silencer according to the present invention.

In a further embodiment as shown in FIG. 30 according to the present invention, there is inserted between the inverting amplifier circuit 313A and the loudspeaker 322 a phase fluctuation circuit 324 acting as a phase fluctuating section which provides a fluctuation to the phase of the output signal of the microphone 321. In this case, the phase fluctuation circuit 324 is to cause the phase of the output signal of the microphone 321 to be fluctuated with respect to the signal of the phase inverted at the inverting amplifier circuit 323A to be different 180 degrees. Provided that the width of the phase fluctuation is, for example, $\pm\alpha(\alpha=180)$ degrees, the driving signal for the loudspeaker 322 will be a signal of a phase deviated by $(180\pm\alpha)$ degrees with respect to the output signal of the microphone 321. Such phase fluctuation circuit 324 may be constituted by means of, for example, a delay circuit and switching element, so that ON/OFF operation of the switching element at indefinite intervals will cause a signal delay by means of the delay circuit to occur at the indefinite intervals.

According to the foregoing silencing arrangement of FIG. 30, the phase relationship between the output signal of the microphone 321 and the driving signal for the loudspeaker 322 and even becoming to satisfy the conditions for causing the howling to occur at a specific time will be fluctuated immediately thereafter. Consequently, the howling generating conditions are not satisfied, and the howling generation can be restrained. In other words, the howling generation which is apt to occur when the amplification degree is made larger can be effectively restrained, even when the amplification degree in the above loop is set to be large so as to elevate the silencing effect. While in the above embodiment the phase fluctuation circuit 324 is shown to be inserted between the inverting amplifier circuit 323A and the loudspeaker 322, by the way, it is also possible to insert this phase fluctuation circuit 324 either in the output section or the input section of the AGC circuit 323B.

Figure 31:
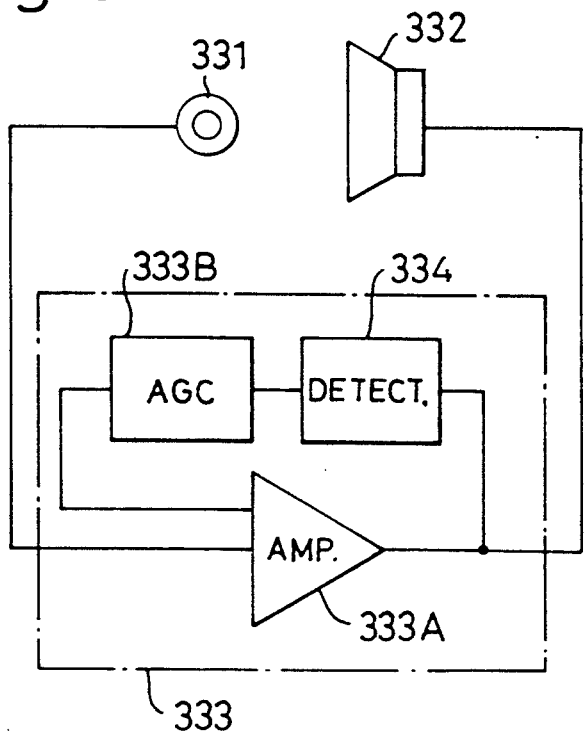

In another embodiment of the present invention as shown in FIG. 31, a frequency detecting circuit 334 capable of detecting the howling is inserted in the input section of the AGC circuit 333B. In this case, the AGC circuit 333B acting as an amplification control section is controlled upon detection by the frequency detecting circuit 334 of a signal of an oscillation (single frequency or the like), and the amplification degree in the loop of the microphone 331 → signal processing circuit 333 → loudspeaker 332 → microphone 331 is lowered. For the AGC circuit 333B, the one which can change over the amplification degree of the inverting amplifier circuit 333A at two stages before and after the howling generation is to be employed. For the frequency detecting circuit 334, a PLL circuit or the like may be employed. Since the howling is to normally oscillate at a single frequency, the howling generation can be exactly detected by the frequency detecting circuit 334. Upon occurrence of the howling, on the other hand, the circuit 334 lowers effectively the amplification degree of the foregoing loop for restraining the howling. With this arrangement, the howling even generated can be immediately stopped and the amplification degree at the foregoing loop can be effectively increased, so that the silencing effect can be increased.

Figure 32:
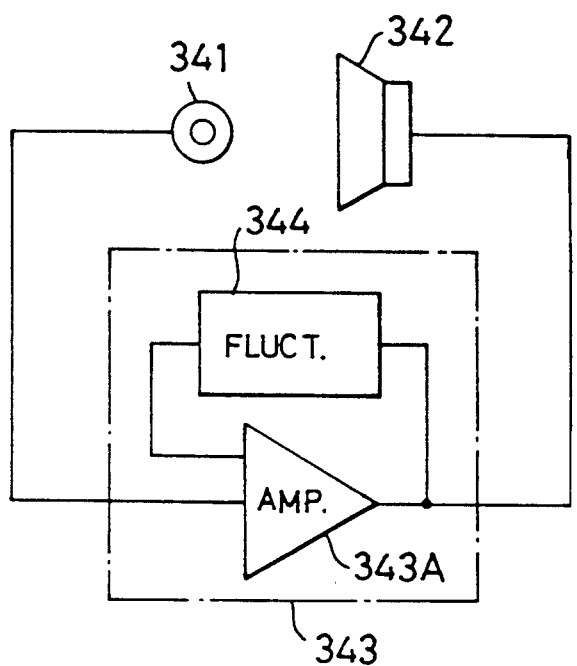
Figure 33:
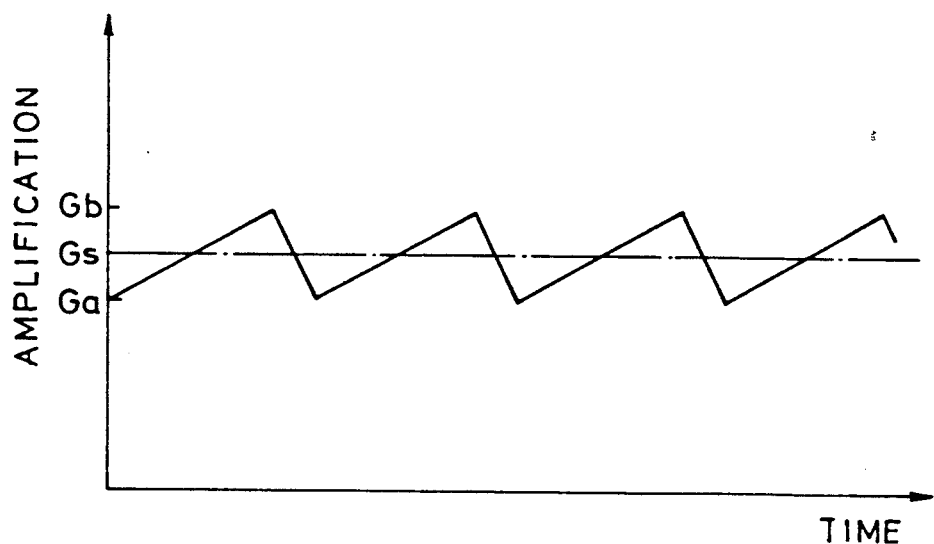
FIG. 33 is an explanatory diagram for an operation of an amplification fluctuating circuit in the silencer of FIG. 32.

In still another embodiment shown in FIG. 32 according to the present invention, an amplification fluctuating circuit 344 is employed in place of the AGC circuit, and this amplification fluctuating circuit 344 is constituted to vary the amplification degree of the inverting amplifier circuit 343A with the lapse of time in such manner as shown in FIG. 33. That is, when the amplification degree of the inverting amplifier circuit 343A upon occurrence of the howling is made Gs, the amplification fluctuating circuit 344 causes the amplification degree Gs in a predetermined range (Ga<Gs<Gb) with the lapse of time, so that the amplification degree will be controllably varied periodically in such a saw-tooth wave form as shown in FIG. 33 with the lapse of time.

According to the arrangement of FIG. 32, the amplification degree even when the same in a loop of the microphone 341 → signal processing circuit 343 → loudspeaker 342 → microphone 341 is made large to cause the howling to occur will be lowered at a next moment so as not to allow the howling conditions to be satisfied, and the howling occurrence can be restrained. On the other hand, though intermittent, it is possible to provide to the above loop a larger amplification degree Gb than the amplification degree Gs which allows the howling to occur, so that the silencing amount can be increased. Though in this case the silencing amount is varied in response to the variation in the amplification degree causes the objective sound waves of the silencing to involve a phenomenon of irregularity, it should be appreciated that a setting of the amplification fluctuating circuit 344 for variation by 1/f fluctuation of the sound wave after the silencing will be able to alleviate the irregularity phenomenon.

While in the respective embodiments of FIGS. 26 to 33 the phase inversion is shown to be realized by the inverting amplifier circuit, the phase inversion may be attained by connecting the circuit to the loudspeaker as the secondary noise source in reverse polarity. While analog signal is employed for internal precessing at the signal processing circuit, it may be possible to employ a D/A processor in place of the signal processing circuit to have the internal processing carried out by a digital signal.

What is claimed is:

1. An acoustic conductance comprising a secondary noise source having an acoustical impedance and including an oscillatory plane facing an interior of a duct, said duct having an axis, an area, a circumference, and an acoustical impedance and coupled to a primary noise source, said secondary noise source being disposed on the circumference of the duct along a plane perpendicular to the axis, the oscillatory plane having a total area substantially more than twice the area of the duct.

2. The acoustic conductance of claim 1 including a slit-like element in said oscillatory plane for matching the acoustical impedance of the secondary noise source to the acoustical impedance of the duct.

3. The acoustic conductance of claim 1 including an acoustic sensor disposed adjacent to the duct no more than 15 cm upstream from a center of the oscillatory plane of said secondary noise source.

4. The acoustic conductance of claim 1 including an acoustic absorption material disposed in an expansion chamber of the duct.

5. The acoustic conductance of claim including an acoustic sensor producing an output signal and signal processing means connected to said acoustic conductance for amplifying and phase-inverting the output signal of the acoustic sensor and for reducing amplification of the output signal when the output signal exceeds a predetermined threshold.

6. An acoustic conductance for attenuating primary noise propagated in a duct, the acoustic conductance comprising:

a secondary noise source having an acoustical impedance for generating noise in a duct and including an oscillatory plane having an area and facing an axis of the duct, the duct having a cross-sectional area, wherein the area of the oscillatory plane is more than twice as large as the cross-sectional area of the duct;

an acoustic sensor disposed adjacent to said secondary noise source for producing an output signal in response to noise in the duct; and means for phase-inverting and amplifying the output signal of said acoustic sensor, the acoustic conductance providing sufficient sound pressure and volume velocity to attenuate the sound pressure and volume velocity of primary noise propagating in the duct whereby the primary noise is silenced.

7. The acoustic conductance of claim 6 wherein said secondary noise source includes a plurality of noise sources, each noise source having a respective oscillatory plane, the oscillatory planes being disposed on a circumferential line describing a cross-section of the duct, the total surface area of the respective oscillatory planes being more than twice as large as the cross-sectional area of the duct.

8. The acoustic conductance of claim 6 including a plurality of said secondary noise sources disposed at mutually spaced positions parallel to the axis of the duct.

9. The acoustic conductance of claim 8 including a plurality of noise sources disposed at every one of the mutually spaced positions and wherein the oscillatory plane comprises the oscillatory planes of the noise sources at each of the spaced positions.

10. The acoustic conductance of claim 7 wherein respective oscillatory planes of the noise sources are disposed opposite each other relative to the axis of the duct.

11. The acoustic conductance of claim 7 wherein the oscillatory planes are arranged in pairs.

12. The acoustic conductance of claim 6 including a slit-like element having a particular shape and opening adjacent to the oscillatory plane for matching the acoustical impedance of said secondary noise source and of the duct.

13. The acoustic conductance of claim 12 wherein said slit-like element is elongated along the axis of the duct.

14. The acoustic conductance of claim 6 wherein said acoustic sensor is connected to said secondary noise source for sensing noise in the duct, for processing the noise sensed, and, in response, driving said secondary noise source.

15. The acoustic conductance of claim 14 wherein said acoustic sensor is disposed adjacent to and upstream, with respect to primary noise propagation in the duct, of the oscillatory plane of said secondary noise source.

16. The acoustic conductance of claim 14 wherein said acoustic sensor is isolated from a fluid flowing in the duct.

17. The acoustic conductance of claim 6 wherein the duct includes an inner periphery and including a layer of an acoustic absorption material disposed on the inner periphery.

18. The acoustic conductance of claim 17 wherein the duct includes a radial expansion chamber and said acoustic absorption material layer is disposed in said expansion chamber.

19. The acoustic conductance of claim 17 wherein said acoustic absorption material layer has an outer periphery and said secondary noise source is disposed on the outer periphery.

20. The acoustic conductance of claim 17 wherein said acoustic absorption material layer has an outer periphery and said secondary noise source and said acoustic sensor are disposed on the outer periphery.

21. The acoustic conductance of claim 6 wherein the means for phase-inverting and amplifying includes means for preventing howling.

22. The acoustic conductance of claim 21 wherein the means for phase-inverting and amplifying includes an amplification control means for reducing amplification when the output signal exceeds a predetermined value.

* * * * *

UNITED STATES PATENT AND TRADEMARK OFFICE
CERTIFICATE OF CORRECTION

PATENT NO. : 5,257,316
DATED : October 26, 1993
INVENTOR(S) : Takeyama et al.

It is certified that error appears in the above-indentified patent and that said Letters Patent is hereby corrected as shown below:

Claim 5, column 14, line 37, after "claim" insert --1--.

Signed and Sealed this

Third Day of May, 1994

Attest:

BRUCE LEHMAN

Attesting Officer

Commissioner of Patents and Trademarks